No. 648,315. Patented Apr. 24, 1900.
J. M. VANDIVORT.
GARDEN PLOW AND CULTIVATOR.
(Application filed Mar. 2, 1900.)
(No Model.)
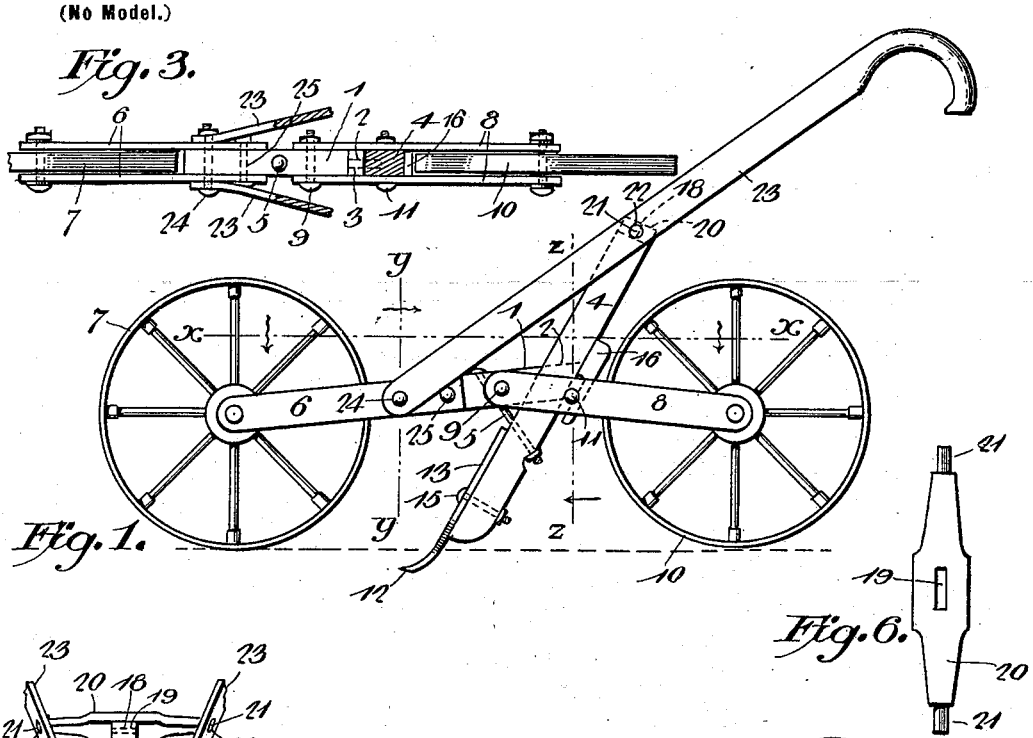
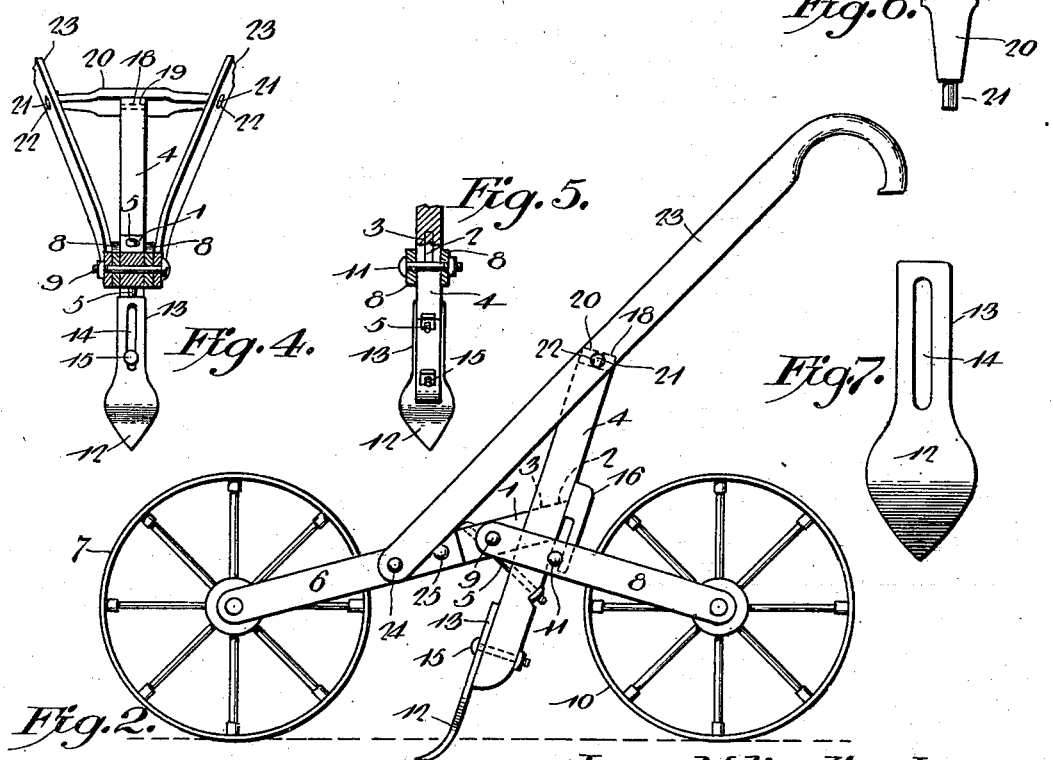
Witnesses
James M. Vandivort, Inventor
By his Attorneys,

UNITED STATES PATENT OFFICE.

JAMES M. VANDIVORT, OF SALEM, MISSOURI.

GARDEN PLOW AND CULTIVATOR.

SPECIFICATION forming part of Letters Patent No. 648,315, dated April 24, 1900.

Application filed March 2, 1900. Serial No. 7,059. (No model.)

*To all whom it may concern:*

Be it known that I, JAMES M. VANDIVORT, a citizen of the United States, residing at Salem, in the county of Dent and State of Missouri, have invented a new and useful Garden Plow and Cultivator, of which the following is a specification.

My invention is an improved wheeled cultivator-plow especially adapted for manual propulsion and operation for garden purposes.

The object of my invention is to provide a light, cheap, simple, strong, and efficient wheeled cultivating-plow provided with means whereby the plow may be adjusted to operate at any required depth and at any desired angle and whereby the plow may be readily turned at the end of a row and reversed or turned bottom side up and trundled as a barrow from one point to another.

My invention consists in a garden plow or cultivator having a centrally-pivoted supporting-frame, with supporting-wheels at the front and rear ends thereof, a plow-standard and handles attached to the front section of said frame, and means to secure the pivoted sections of the frame at any desired adjustment of the same.

My invention further consists in the peculiar construction and combination of devices hereinafter fully set forth, and pointed out in the claims.

In the accompanying drawings, Figure 1 is a side elevation of a hand wheeled garden plow or cultivator embodying my improvements, showing the same adjusted so as to cause the shovel or tongue to operate deeply in the earth. Fig. 2 is a similar view of the same, showing the plow adjusted in another position. Fig. 3 is a top plan view, partly in section, on the line *x x* of Fig. 1. Fig. 4 is a transverse sectional view on the line *y y* of Fig. 1. Fig. 5 is a similar view on the line *z z* of Fig. 1. Fig. 6 is a detail view of the crossbar for the handles. Fig. 7 is a detail view of the plow shovel or tongue.

The plow-beam 1, which is of suitable length, has the tenon 2 at its rear end, which fits in a mortise 3 in the plow standard or stock 4, the latter being inclined with relation to the plow-beam and further secured thereto by means of an inclined bolt-rod 5, which passes through said beam and said plow-standard, as shown.

On the front portion of the plow-beam, on opposite sides thereof, are a pair of bars 6, which project forward beyond the front end of the beam, and between which bars, at the forward ends thereof, is mounted the front supporting-wheel 7, which is of suitable size, as shown. The beam 1 and the forward-extending bar 6 comprise the front section of the supporting-frame, the rear section of which is formed of a pair of rearward-extending bars 8, which are pivotally connected to the beam, near the rear end of the latter, by a transversely-disposed clamping-bolt 9, which passes through said bars 8 and said beam, as shown, said bars bearing on opposite sides of the rear portion of said beam and on opposite sides of the plow-standard, as shown in Fig. 2. A rear supporting-wheel 10, which preferably is of the same size as the front supporting-wheel 7, is mounted between the rear ends of the rearward-extending bars 8, which constitute the rear section of the wheeled supporting-frame of the plow or cultivator. A clamp-bolt 11, disposed transversely in rear of the plow-standard and proximate thereto, connects the bars 8, and by means of the nuts or taps on said bolt 11 and the pivotal bolt 9 said bars 8 may be clamped on opposite sides of the plow-beam and plow-standard at any desired adjustment, so as to support the plow-standard at any desired angle and at any desired height, thereby enabling the cultivating shovel or tongue 12 on the front side of the standard to be set at any desired adjustment. Said cultivating shovel or tongue has an upward-extending flat arm 13, which bears against the front side of the plow-standard, as shown, and in said upward-extending arm is an elongated slot 14, which receives a clamping and adjusting bolt 15, said slot and said bolt adapting said shovel or tongue to be vertically adjusted and secured on the plow-standard, as may be desired.

A space-block 16 is secured on the rear side of the plow-standard and has a downward-extending arm 17, said space-block and said arm corresponding in width with that of the standard and being disposed between the rearward-extending bars 8. The space between the front side of the arm 17 and the rear side of the standard is sufficient to clear the clamping-bolt 11, and said block serves to prevent the rear ends of the bars 8 from being clamped, so as to cause undue friction on the journals of the rear supporting-wheel 10.

The upper end of the plow-standard is provided with a tenon 18, which fits in a mortise 19 in the center of a cross-bar 20, which has shouldered tenons or projections 21 at its ends, that fit in corresponding transverse openings 22 about midway of the length of the plow handle-bars 23. The front ends of said handle-bars bear against the outer sides of the forward-extending bars 6 and are secured thereon by a clamping-bolt 24, which passes transversely through said handle-bars, said bars 6, and the plow-beam and serves to clamp the said bars 6 to the plow-beam and also to secure the front ends of the handle-bars. A bolt 25 also serves to secure the bars 6 to the beam.

It will be observed by reference to the drawings and understood from the foregoing description that the wheeled supporting-frame is toggle-jointed at its center and that the front section of said wheeled supporting-frame has the plow-standard and handle-bars, so that the standard may be readily elevated, depressed, and arranged at any desired angle by means of the handle-bars and that by means of the rearward-extending bars 8 and pivotal and clamp bolts 9 17 the said toggle-jointed frame may be set and fixed at any required adjustment.

It will be further understood by reference to the drawings that by depressing the plow-handles the front supporting-wheel and the plow cultivating shovel or tongue may be raised from the ground, so that the weight of the implement will be entirely supported by the rear wheel 10, thus adapting the implement to be readily turned at the ends of the rows when in use.

It will be further understood by reference to the drawings that by inverting my improved wheeled cultivating-plow or turning the same upside down the same may be entirely supported upon the front wheel thereof and by means of the handle-bars readily trundled as a barrow from one point to another, which is a matter of great convenience to persons using cultivating-plows of this class.

Having thus described my invention, I claim—

1. A wheeled cultivating-plow, comprising the centrally-toggle-jointed supporting-frame having the supporting-wheels at its front and rear ends, the front section of the frame having the standard and handles secured thereto and the rear section of the frame comprising clamp-bars, between which the rear supporting-wheel is mounted, clamping-bolts at the front end of said clamp-bars, said bolts being disposed in front and rear of the plow-standard, and the forward bolt extending through the plow-beam and forming also the pivotal connections between said front and rear frame-sections, substantially as described.

2. A wheeled cultivating-plow, comprising the beam, the standard secured to the rear end thereof, the handles having the cross-bar secured to the upper end of the standard, the bars bolted to the sides of the beam and projecting from the front end thereof, one of the bolts, which secures said bars to said beam serving also to secure the front ends of the handles, the front supporting-wheel mounted between said forward-extending bars, the rearward-extending bars pivotally attached to the beam and between which is mounted the rear supporting-wheel, and the clamp-bolts for said rearward-extending bars, disposed in front and rear of the plow-standard, the forward clamp-bolt forming the pivot for said rearward-extending bars, substantially as described.

3. In a wheeled cultivating-plow, the centrally-pivot-jointed supporting-frame having supporting-wheels at its front and rear ends, the standard and handles attached to the front section of said frame and means to secure the sections of the frame when set at any desired adjustment, substantially as described.

4. In a wheeled cultivating-plow, the combination of the beam having the forked forward end, the front supporting-wheel mounted in said fork, the standard secured to the rear end of the beam and extending above the same, the handle-bars having a cross-bar secured to said upper extension of the standard, the front ends of said handle-bars being secured to the beam, the rearward-extending arms pivotally connected to the beam, said arms bearing on opposite sides of the standard, the rear supporting-wheel mounted between said rear-extending arms, and means for clamping said arms to the standard, substantially as described.

In testimony that I claim the foregoing as my own I have hereto affixed my signature in the presence of two witnesses.

JAMES M. VANDIVORT.

Witnesses:
LOTUS. D. VANDIVORT,
FRANK MAY.